United States Patent
Westwood et al.

(10) Patent No.: US 7,542,786 B2
(45) Date of Patent: Jun. 2, 2009

(54) SYSTEM AND METHOD FOR CHANGING A RING TONE

(75) Inventors: William R. Westwood, Escondido, CA (US); Sidney Sitachitt, Carlsbad, CA (US)

(73) Assignee: Kyocera Wireless Corp., San Diego, CA (US)

( * ) Notice: Subject to any disclaimer, the term of this patent is extended or adjusted under 35 U.S.C. 154(b) by 439 days.

(21) Appl. No.: 11/482,460

(22) Filed: Jul. 7, 2006

(65) Prior Publication Data

US 2008/0009327 A1    Jan. 10, 2008

(51) Int. Cl.
H04M 1/00   (2006.01)
H04B 1/00   (2006.01)

(52) U.S. Cl. ................ 455/567; 455/70; 455/550.1

(58) Field of Classification Search ........ 455/418, 455/419, 420, 422.1, 567, 550.1, 67.11, 68, 455/70, 88, 355
See application file for complete search history.

(56) References Cited

U.S. PATENT DOCUMENTS

| | | | |
|---|---|---|---|
| 6,263,191 B1 * | 7/2001 | Proctor | 455/69 |
| 6,931,236 B2 | 8/2005 | Kaplan | |
| 6,954,136 B2 | 10/2005 | Sauer | |
| 7,318,098 B2 * | 1/2008 | Steinberg et al. | 709/227 |
| 2005/0096030 A1 | 5/2005 | Boyd et al. | |
| 2006/0161628 A1 * | 7/2006 | Nagy et al. | 709/206 |
| 2007/0077924 A1 * | 4/2007 | Bhogal et al. | 455/420 |
| 2007/0161412 A1 * | 7/2007 | Nevid et al. | 455/567 |

* cited by examiner

*Primary Examiner*—Sonny Trinh

(57) ABSTRACT

A wireless communication system, a wireless handset, and a method for remotely changing a ring tone on the wireless handset are described. The wireless communication system comprises antennas, a network system and a set of programming instructions. The network system processes a request to change the first ring tone to a second ring tone. The request is made from the remote electronic device that is accessed by a validated user. The set of programming instructions are communicated from the network system to the wireless handset via the antennas. The wireless handset with the first ring tone comprises a handset memory, a handset antenna, a processor, and a handset speaker is also described. The processor is configured to process the set of programming instructions communicated by the validated user that changes the first ring tone to the second ring tone. The method comprises permitting the validated user to access a menu having a user selectable option that permits changing the first ring tone to the second ring tone.

17 Claims, 7 Drawing Sheets

SYSTEM AND METHOD FOR CHANGING A RING TONE

FIELD OF THE INVENTION

The present invention relates to a system and method for changing the ring tone on a wireless handset. More particularly, the invention relates to using a network system to change the ring tone on a wireless handset.

BACKGROUND

Wireless phones are commonly misplaced, and user's need assistance locating their wireless phones. For example, a wireless household phone that is linked to a landline may have a pager button on the recharging station that permits a caller to easily locate the phone. When the pager button is actuated, the recharging station sends out a signal that causes the wireless household phone to broadcast and audible ring that allows the misplaced wireless household phone to be easily located.

Networked wireless phones that operate within a relatively broad service area can also be misplaced. These networked wireless phones include, but are not limited to, cellular phones, WiFi enabled phones, WiMax phones, and other such wireless phones that operate using a network system. Since the networked wireless devices operate within a much broader service area than the household broadcast area, the problem with locating a networked wireless phone is magnified. For example, a misplaced mobile phone may be left in a variety of different places such as a car, a household couch, a desk drawer at home, a desk drawer in the office, or a briefcase. Each of these locations may be easily accessible by the owner, however, the networked wireless phone may not be visible, and thus not be located. This problem is further compounded by the variety of different inaudible ring tones including, but not limited to, vibrate mode, low volume ring tones, the combination of vibrate and low volume ring tones, or other such ring tones that may be inaudible if the mobile phone is misplaced.

Commonly, the owner of a cellular telephone may attempt to locate the misplaced cell phone by directly calling the cellular phone from another telephone. However, if cellular phone ring is not audible, the cellular phone will remain lost. Therefore, even when using another telephony device to call the misplaced mobile phone, if the mobile phone ring tone is inaudible or not visible, the networked wireless handset will not be located.

SUMMARY

A wireless communication system comprising antennas, a network system and a set of programming instructions is described. The antennas are operatively coupled to a mobile switching center. The antennas initiate a plurality of communications with a wireless handset having a first ring tone that is imperceptible. The communications with the wireless handset are initiated from a remote electronic device. The network system is communicatively coupled to the mobile switching center. The network system processes a request to change the first ring tone to a second ring tone. The request is made from the remote electronic device that is accessed by a validated user. The set of programming instructions are communicated from the network system to the wireless handset via the antennas. The set of programming instructions is configured to change the first ring tone to the second ring tone.

The wireless handset with the imperceptible ring tone comprises a handset memory, a handset antenna, a processor, and a handset speaker is also described. The handset memory has a first ring tone stored thereon. The handset antenna is configured to receive the set of programming instructions associated with the second ring tone. The processor is operatively coupled to the handset memory and the handset antenna. The processor processes the set of programming instructions communicated by the validated user that changes the first ring tone to the second ring tone. The handset speaker transforms varying electrical signals associated with the second ring tone into a perceptible second ring tone.

The method for remotely changing a ring tone on the wireless handset is further described. The method comprises accessing the network system from the remote electronic device. The network system communicates with the wireless handset. The method also comprises permitting the validated user to access a menu having a user selectable option that permits changing the first ring tone that is imperceptible on the wireless handset, and allowing the validated user to interact with the menu so that the first ring tone on the wireless handset can be converted to a second ring tone that is perceptible.

BRIEF DESCRIPTION OF THE DRAWINGS

The present invention will be more fully understood by reference to the following drawings which are for illustrative, not limiting, purposes.

DETAILED DESCRIPTION

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the systems and apparatus described hereinafter may vary as to configuration and as to details. Additionally, the method may vary as to details, order of the actions, or other variations without departing from the illustrative method disclosed herein.

Figure 1:
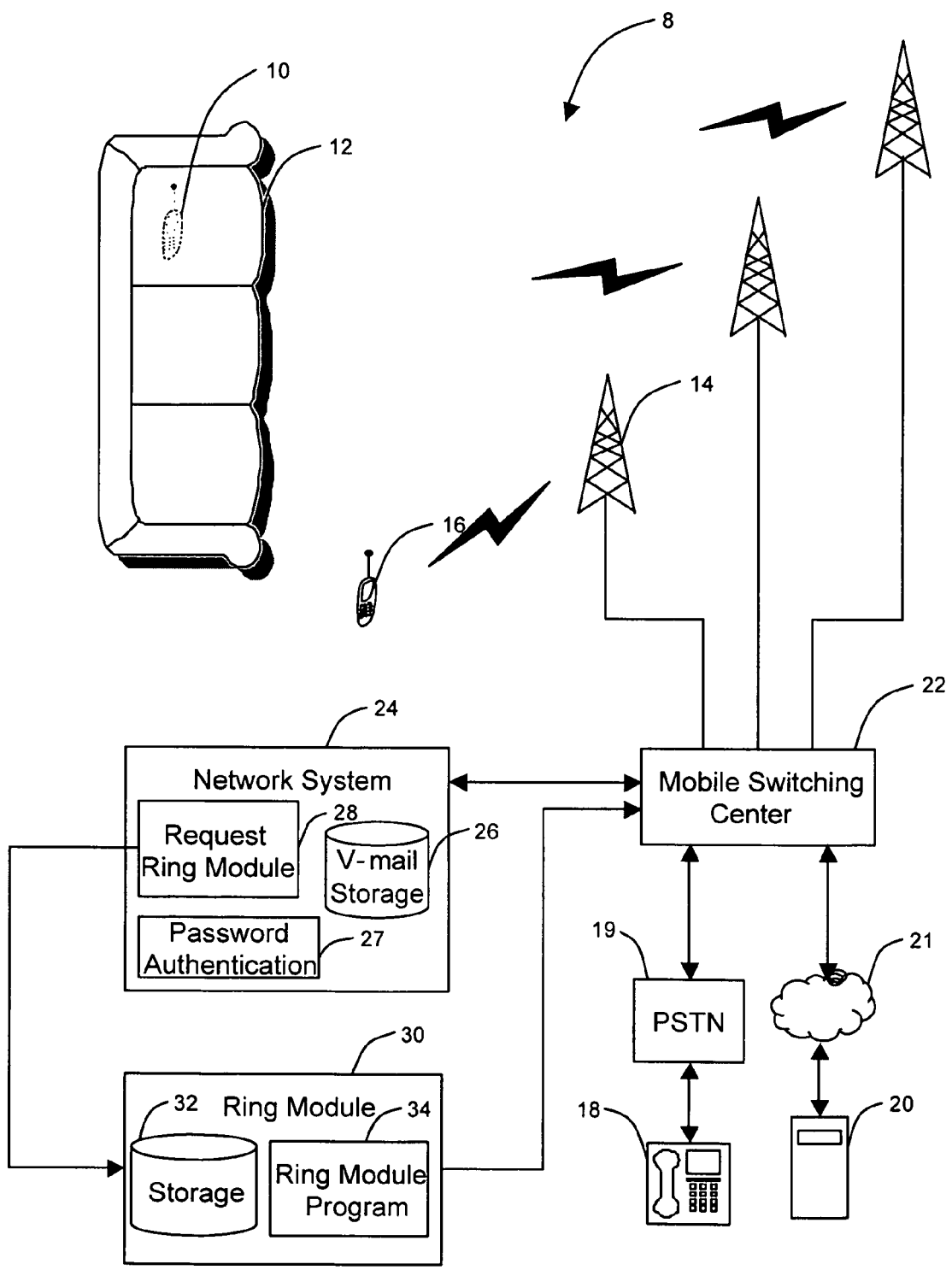
FIG. 1 shows an illustrative communication system that permits changing the ring tone on a first wireless handset.

Referring to FIG. 1 there is shown an illustrative communication system that permits changing the ring tone on a first wireless handset. By way of example and not of limitation, the communication system 8 locates a first wireless handset 10 that is misplaced in a couch 12 and underneath a pillow, however, the user is unable to find the wireless handset 10. The wireless handset 10 may be a mobile handset, mobile phone, wireless phone, portable cell phone, cellular phone, portable phone, a personal digital assistant (PDA), or any type of mobile terminal which is regularly carried by a user and has all the elements necessary for operation in a wireless communication system. The wireless communications include, by way of example and not of limitation, CDMA, GSM or UMTS or any other wireless communication system such as wireless local area network (WLAN) or WiMAX. It shall be appreciated by those of ordinary skill in the art that the term wireless handset, mobile handset, wireless phone, and mobile phone are interchangeable.

To find the wireless handset 10, the user may elect to call the wireless handset from a remote electronic device. In the illustrative example the wireless handset 10 is located beneath a pillow on the couch 12, and the wireless handset 10 is not visible and the ring tone is not audible through the pillow. Although, the wireless handset 10 is in communication with an antenna 14, the wireless handset 10 can not be found by the user or owner of the mobile handset 10 because the wireless handset 10 is imperceptible. The antenna 14 may be one of a plurality of base station antennas associated with a cellular phone network, or an antenna associated with WLAN access point, or any other such antenna that is used to communicate with the wireless handset 10.

For example, the wireless handset 10 may be imperceptible because the ring tone is not audible, the ring tone volume is too low, or the wireless handset 10 is not visible. Thus, the wireless handset 10 is imperceptible because the wireless handset 10 can not be located using one or more human senses.

However, if the wireless handset 10 had a perceptible ring tone, the wireless handset 10 could be found by the user. The perceptible ring tone is capable of being perceived by one or more senses such as hearing or sight. The perceptible ring tone is configured to facilitate finding the wireless handset 10. For example a perceptible ring tone may be a loud and persistent sound, so that in spite of the pillow muffling the sound, the wireless handset 10 could be found by the user. Additionally, if the mobile handset has some controllable lighting, the perceptible ring tone may comprise a blinking colored light and/or display or other visible action that could be enabled on the wireless handset 10. Furthermore, the perceptible ring tone may be associated with one or more particular frequencies, tones, or sounds. Sounds may be specific sounds such as a police siren, ambulance siren, train whistle, fire engine siren, or other such sound associated with communicating an alarm. The perceptible ring tones may be communicated in a persistent and periodic manner, so that the illustrative police siren is heard every few minutes to preserve battery life. The auditory ring tone could also be combined with the visible ring tone to further facilitate locating the misplaced wireless handset 10.

The communication system 8 is a wireless communication system that is configured to permit a user to remotely modify a ring tone on a wireless handset, so that the user can locate the misplaced handset. The wireless communication system 8 comprises a mobile switching center 22, a network system 24, and a ring tone module 30. The mobile switching center 22 is operatively coupled to a plurality of base station antennas 14 that initiates communications with the first wireless handset 10 having the initial ring tone or first ring tone.

Additionally, the mobile switching center 22 is configured to communicate with a remote electronic device. The remote electronic device may be a separate wireless handset 16, a telephony device 18 that communicates with a public switched telephony network (PSTN) 19, a personal computer 20 that is communicatively coupled to a network cloud 21, and any other such device that is enabled to communicate with the wireless handset 10.

Those skilled in the art shall appreciate that the term "ring tone" refers to the response made by a mobile handset to indicate an incoming call. For example, a ring tone may be a sound such as a monophonic or polyphonic sound that mimics a variety of sounds such as an ambulance, a train whistle, or a police siren. Additionally, the term ring tone also includes a silent ring tone such as the "vibrate" mode associated with a mobile phone. Furthermore, the ring tone may include initiating a visual action such as activating one or more light emitting diodes (LEDs) on the mobile handset. Thus, a ring tone may be associated with an audible ring, a silent ring, i.e. vibrate mode, a visual action, or any combination thereof.

The network system 24 is communicatively coupled to the mobile switching center 22. The network system 24 provides an option that permits changing the first ring tone to a second ring tone. In operation, the caller uses the remote electronic device such as wireless handset 16, telephone 18, or computer 20 to initiate communications with the misplaced handset 10. The communications network then proceeds to locate the wireless handset 10 and initiates communications with the wireless handset 10, in spite of the user's inability to find the misplaced wireless handset 10. After a set number of rings to the handset 10, the mobile switching center 22 forwards the user to the network system 24. It shall be appreciated by those of ordinary skill in the art that the modern mobile phone or mobile handset is continually being instructed by the network system to perform network adjustment remotely, and it is this capability that is used to instruct the mobile handset to change its ring tone.

In the illustrative embodiment, the mobile switching center 22 switches from communicating with the wireless handset 10 to communicating with the network system 24 after a couple of rings on the wireless handset 10. The network system 24 comprises a voice mail system 26 that provides voice mail storage, which may be accessed by the misplaced handset 10. The network system 24 is configured to process a request to change the first ring tone to a second ring tone. Generally, the request may come from a validated user such as the owner of the misplaced wireless handset 10, or the service provider that manages the network, or any such entity or person that is authorized to remotely change the ring tone on the wireless handset 10.

The request to change the first ring tone on the wireless handset 10 is going to be initiated from the remote electronic device such as the wireless handset 16, the telephone 18, the computer 20, or any other such device that is capable of communicating with the wireless handset 10. In one embodiment, the request may be communicated by permitting a user, e.g. a validated user, to access a menu on the network system 24 having user selectable options that allows remotely changing ring tones. In an alternative embodiment, the request is communicated directly to the wireless handset 10 from a remote electronic device that includes an attachment ring tone, e.g. an executable file, which is enabled or activated on the wireless handset 10 without relying on the network system 24.

The request may be made by interfacing with the user selectable options that are associated with the network system 24, and which are described in this specification. The request may also be communicated using a short message service (SMS) message or a multimedia messaging service (MMS) that communicates with either the network system 24 or communicates directly with the wireless handset 10. The SMS or MMS message may be communicated from the illustrative wireless handset 16, telephone 18, or a computer 20. Similarly, the request may be communicated via the network system 24 or directly to the wireless handset 10 using a web page or e-mail functionality that is accessible on the computer 20, the telephone 18, or the wireless handset 16.

Although greater detail is provided with respect to network operations, it shall be appreciated by those of ordinary skill in the art that direct communications between an remote electronic device and the misplaced ireless handset 10 may also achieve the same objectives of changing an imperceptible ring tone to a perceptible ring tone without having to rely on the network system 24, and simply relying on the use of attachments that reprogram the wireless handset 10 and change the ring tones.

In the illustrative embodiment, the network system 24 is configured to prompt the user communicating via handset 16, telephone 18, or PC 20 to provide a password to access the network, and which permits the validated user to change ring tones on handset 10. The password is authenticated by a password authentication module 27. The password authentication module 27 may support a plurality of passwords. For example, a first password may be used to access voice mail storage 26, and a second password may be required to change the ring tone on a particular handset.

The validated user may then be able to interface with a plurality of user selectable options that permit changing the first ring tone on the misplaced wireless handset 10. The plurality of user selectable options may include selecting a particular sound, a particular time period to play the particular sound, a particular time period to start and end the ring tone, a volume for the sound, a visible light option, a blinking light option, a preserve battery option, and any other such option that would permit the user to remotely control the second ring tone. For example, in the illustrative embodiment, the network system 24 comprises a request ring module 28. The request ring module 28 provides a user with an option to change the ring tone on the misplaced handset 20, and may be accessed after password authentication. After receiving an instruction from the user to change the ring tone, the request ring module 28 goes to ring module 30. Ring module 30 may be embedded in the network system 24, or the ring module 30 may be a stand-alone unit that is communicatively coupled to the network system 24. The ring module 30 includes a storage database 32 and a ring module program 34.

The ring module program 34 comprises a set of programming instructions with computer readable programming instructions that are communicated to the misplaced handset 10. The storage database 32 provides sufficient memory to store a plurality of ring module programs that are accessible via the user selectable options. The set of programming instructions are communicated from the network system 24 or the ring module 30 to the wireless handset 10 using at least one of the plurality of antennas 14. The set of programming instructions are configured to change the first ring tone on the wireless handset to a second ring tone.

The set of programming instructions may be downloaded to the mobile handset 10, and the downloaded programming instructions may then be executed and stored on the mobile handset 10. The downloaded programming instructions comprise a new ring tone that is not already loaded or stored on the wireless handset 10, and this new ring tone is the active ring tone or second ring tone that is played on the wireless handset 10. Alternatively, the set of programming instruction may simply call an alternative ring tone that is already stored in the wireless handset 10, and make this alternative ring tone or second ring tone the active ring tone that is played on the wireless handset 10.

The second ring tone is perceptible. By way of example and not of limitation, the perceptible ring tone is an audible ring tone that is particularly loud. The audible ring tone may pulse on and off to preserve battery life and give the user time to locate the misplaced handset 10. Additionally, the validated user may have the option to select the periods between each audible ring so that the user can have an extended opportunity to locate the misplaced handset 10. The audible ring tone may also be a particularly distinctive ring tone such as train whistle, police siren, or other such distinctive sounds that facilitate locating the misplaced handset. Furthermore, the perceptible ring tone may comprise a particular visible action or visible ring tone in which the display or LED lights are activated so that the illustrative handset 10 is visually distinguishable. For example, the LED lights may pulse at the brightest setting possible, or the LED lights may be activated in a particular pattern such as a circular pattern, or different color LED lights may also be activated at different times, or any combination thereof.

In another embodiment, there may simply be two ring module programs, referred to as a "beacon ring" program and a "beacon light" program that are activated separately or together. By way of example, the beacon ring program comprises a ring tone that is piercingly loud. The tone, timber, and quality of the beacon ring attempts to facilitate locating the misplaced phone 10. The beacon light program activates one or more lights on the handset 10 to facilitate locating the misplaced handset 10. The beacon light program may be used in the early morning hours to avoid disturbing other individuals that may be sleeping. The combination beacon ring and beacon light may be recommended in a particular setting such as an airplane, in which time is of essence and there may not be a need to preserve battery life. An audible beacon ring tone with a long period in between the ring tones may be desirable if the handset is misplaced during travel from the user's residence, to their automobile, to their office.

Furthermore, there may be a variety of different handsets accessing the network, and the ring module 30 is configured to store a plurality of ring module programs 34 for a variety of different handset that are supported by the network. Thus, there may a plurality of different ring tones and a plurality of different options may be presented to the user, or may have to be stored on the network. Those skilled in the art shall appreciate that the particular type of ring tone may also be dependent on system requirements, system limitations, handset requirements, handset limitations, and user expectations.

After the set of programming instructions are communicated to the misplaced wireless handset 10, the wireless handset 10 proceeds to re-program itself by executing the programming instructions. Once the initial or first ring tone has been modified to a second ring tone, e.g. beacon ring tone, the user can continue the process of attempting to find the misplaced wireless handset 10.

Figure 2:
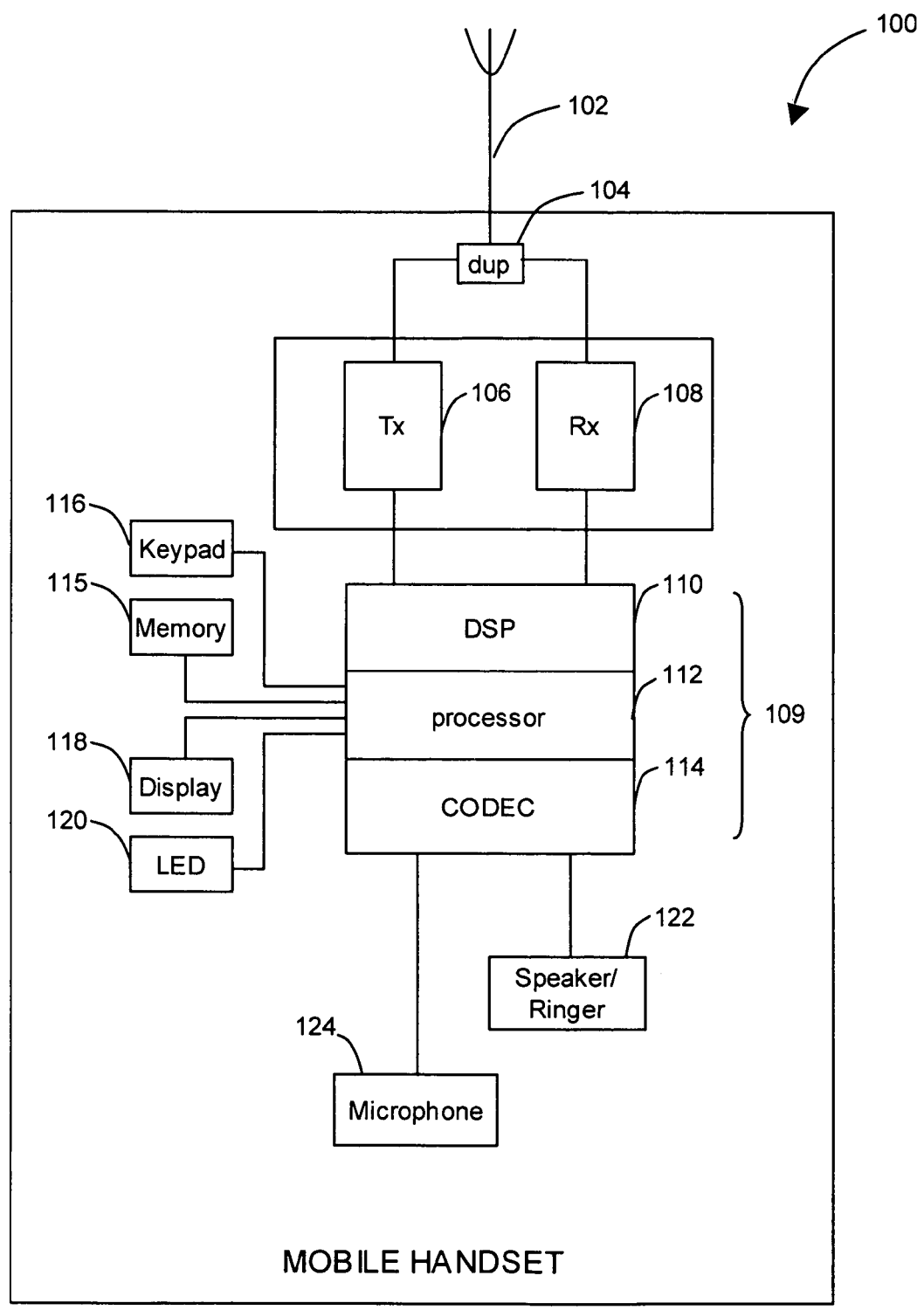
FIG. 2 shows an illustrative diagram of a mobile handset configured to operate in the illustrative communication system.

Referring to FIG. 2 there is shown an illustrative mobile handset 100 configured to operate within the illustrative communication system 8. An illustrative embodiment of the first wireless handset 10 and the second wireless handset 16 is provided with the mobile handset 100. The illustrative mobile handset 100 comprises a first antenna element 102 that is operatively coupled to a duplexer 104, which is operatively coupled to transmitter 106 and receiver 108. An illustrative control module 109 comprises a digital signal processor (DSP) 110, a processor 112, and a codec 114 that are communicatively coupled to the transmitter 104 and receiver 108. The DSP 110 may be configured to perform a variety of operations such as controlling the antenna 102, transmitter 106, and receiver 108 operations. The processor 112 is operatively coupled to a memory 115, a keypad 116, a display 118, and at least one set of LED lights 120. The processor 112 is also operatively coupled to a codec module 114 that performs the encoding and decoding operations and is communicative coupled to a speaker or ringer 122, and a microphone 124.

The illustrative mobile handset 100 may be built as a light weight and small device adapted to be portable and may be conveniently carried around by a user on a regular basis. The mobile handset 100 is further adapted for caller operation and is enabled to permit a user to manually input data with the keypad 116 that may be a normal key pad, such as key pad for a cell phone or a PDA, and may additionally include specific input keys, such as a scrolling means or the like, to input particular instructions or to perform particular selection functions. Additionally, the input data or request may be taken from voice instructions that are received from microphone 124 or a combination of voice instructions and DTMF signals. The memory module 115 may be for storing input data or storing programming instructions that have been downloaded to the mobile handset 100 or previously programming in the wireless handset 100.

In the illustrative embodiment, the processor 112 is configured to process the plurality of computer instructions associated with ring tones downloaded from the network system 24 (see FIG. 1). For example, a validated user may place a request that the initial or first ring tone be modified to a second ring tone using a remote electronic device as described above. The set of programming instructions for the beacon or second ring tone may be downloaded to the mobile handset 100 and stored in memory 115, or the set of programming instructions may simply call a ring tone that is already stored in memory 115. In yet another embodiment, an attachment having an executable program or instruction is sent to the wireless handset 100 and the wireless handset 100 is configured to open the executable file, which changes the imperceptible ring tone to a perceptible ring tone.

In the illustrative embodiment, the network system 24 is configured to instruct the processor 112 to execute the plurality of programming instructions associated with making the second ring tone the active ring tone on handset 100. As described above, the request to change the ring tone may be initiated from a user accessing the network system 24 using a voice prompted user menu on the network system 24, SMS instruction, MMS instruction, web page or even an e-mail.

By way of example and not of limitation, the second ring tone that is programmed into the mobile handset 100 is a detectable or perceptible ring tone that facilitates locating the misplaced wireless handset 10. The perceptible ring tone is noticeable and may be a particularly distinctive ring tone as described above. The perceptible ring tone may comprise an audible ring tone that is communicated to the speaker 122 from instructions that are processed by processor 112. The speaker 122 is then configured to transform varying electrical signals associated with the second ring tone to a perceptible ring tone such as a high volume ring tone. Furthermore, the perceptible ring tone may comprise a particular visible action or visible ring tone in which the display 118 or the set of LED lights 120 are activated so that the illustrative handset 10 is visually distinguishable. For example, the LED lights 120 may pulse at the brightest setting possible, or the LED lights 120 may be activated in a particular pattern such as a circular pattern, or different color LED lights may also be activated at different times, or any combination thereof.

Figure 3A:
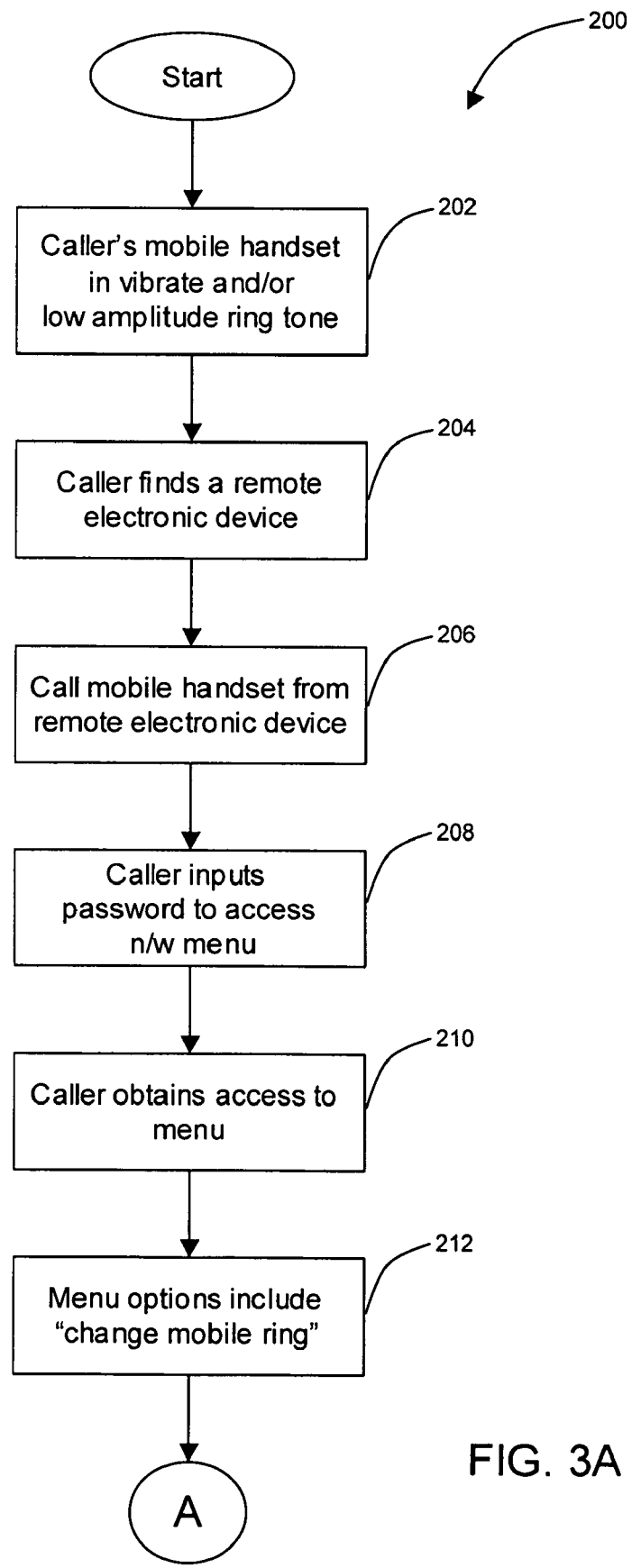
FIG. 3A shows an illustrative flowchart that permits a caller to remotely change a ring tone on the first wireless handset.

Referring to FIG. 3A and FIG. 1 there is shown an illustrative flowchart 200 that permits a caller to remotely change a ring tone on the wireless handset 10. At block 202, the user cannot find the wireless handset 10 because his handset is in "vibrate" mode or a low amplitude ring mode. The user then decides to call the wireless handset 10 to find the misplaced handset 10. Thus, the user's status is also that of a caller. At block 204, the caller or user finds a remote electronic device such as another handset 16, telephone 18, or computer 20. The caller then proceeds to call the misplaced handset 10 from the remote electronic device at block 206.

The wireless handset 10 registers with the local base station when it is turned on. Once the network system 24 knows where the mobile handset is located, the network system 24 sends to the wireless handset 10 a paging messaging telling the wireless handset 10 that it has a call. A couple of rings or set number of rings are then initiated at the wireless handset 10. The caller hears a set of pulsed rings that simulate the rings on the wireless handset 10. If communications are not initiated from the handset 10, the caller is transferred to the network system 24.

Thus, after a set number rings, the caller is transferred to the network system 24. If the caller is leaving a voice mail message, the caller is prompted to provide a voice mail message. However, if the caller is calling to check their own voice mail, the caller generally must input a password to permit the caller to access stored voice mails. In the illustrative embodiment, after the caller has been redirected to the voice mail system, the network system 24 provides the caller with an option to override the voice mail system.

At block 208, the caller or user may be prompted to input a password to access a network menu that permits the caller to change the ring tone on the misplaced wireless handset 10. After inputting the appropriate password and being recognized as a validated or authenticated user, the caller obtains access to a menu that is located on the network system 24 as described in block 210. At block 212, the menu options include changing the ring tone on the mobile phone 10 are provided. The method then proceeds to circle A.

Figure 3B:
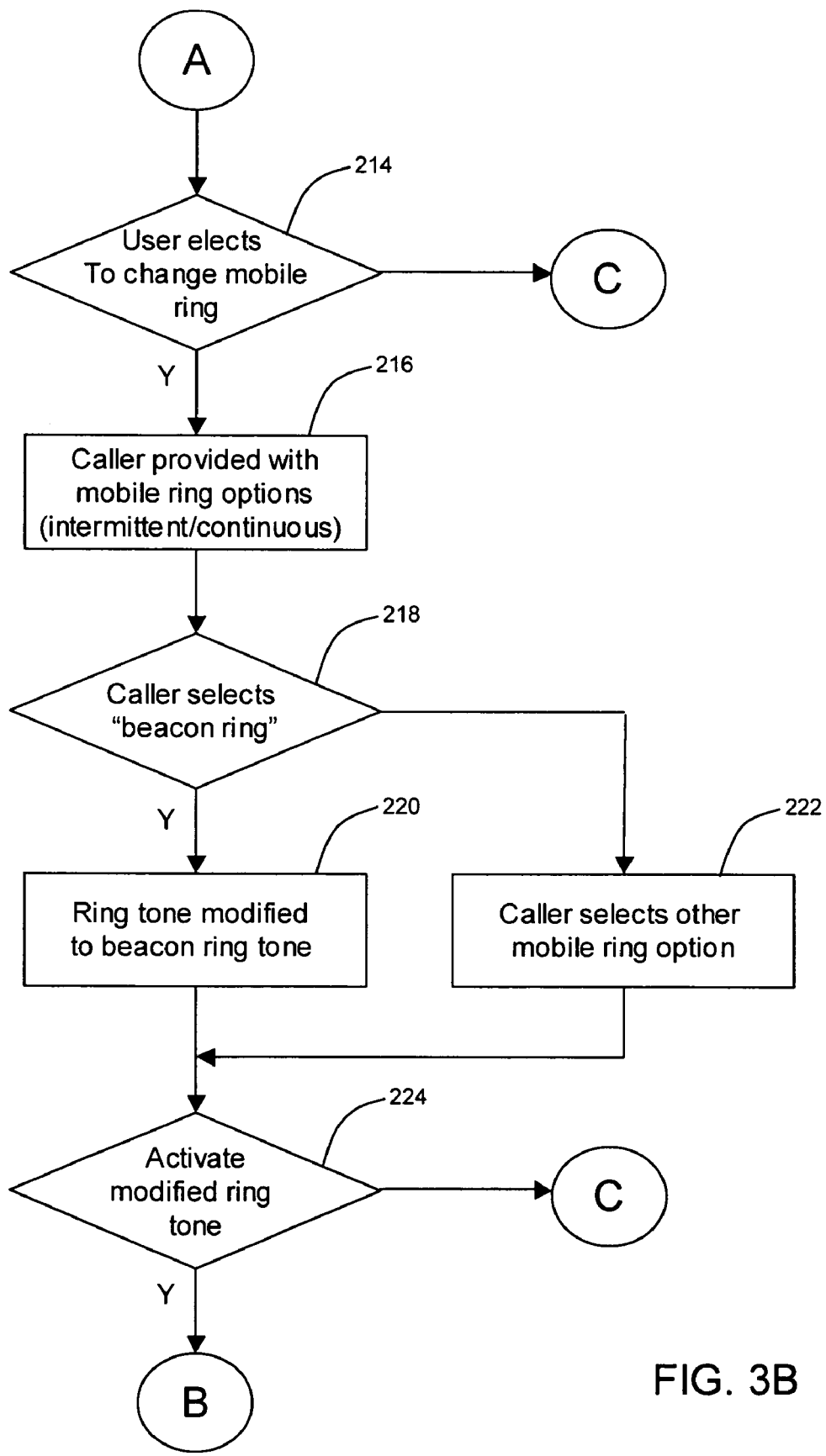
FIG. 3B shows a continuing illustrative flowchart that was initiated by FIG. 3A.

Referring to FIG. 3B there is shown a continuing illustrative flowchart that was initiated by FIG. 3A, and which is initiated at circle A. At decision diamond 214, the user is prompted to elect to change ring tone on the wireless handset 10. If the user elects to not change the mobile ring tone, the method proceeds to circle C and the user is taken to block 228 (FIG. 3C), where the caller may be prompted to select other menu options, such as returning to the voice mail system. However, if the user elects to change the ring tone, the method proceeds to block 216 where the caller is provided a variety of mobile ring options. By way of example and not of limitation, the ring options may include an intermittent ring tone, e.g. bell, or a continuous ring tone, e.g. siren, or a "beacon" ring, or other such ring tone as described throughout this description.

In the illustrative method, the caller proceeds to decision diamond 218 where the caller has the option of selecting a beacon ring tone. If the caller does not select the beacon ring tone, the method proceeds to block 222 where the caller selects another perceptible ring tone option as described herein. However, if the caller does select a beacon ring tone, then the method proceeds to block 220 where the caller may be prompted for either an intermittent beacon ring or a continuous beacon ring. The caller may be able to establish the period between the intermittent beacon rings, e.g. 10 seconds. Additionally, the beacon ring tone may include an audible ring tone, visual action ring tone, or a combination thereof.

At decision diamond 224, the decision to activate the second ring tone is initiated. If the second ring tone can not be activated, the method proceeds to circle C and block 228. By way of example and not of limitation, the modified ring tone may not be activated because the illustrative handset 10 may be outside the standard network system and may be "roaming." Roaming occurs when a subscriber on one wireless service provider uses the facilities of another wireless service provider. Many carriers have roaming agreements, but they do not have an over-the-air programming agreement. Thus, when a mobile phone is on roaming, the mobile phone will not have the same programming capability. If the modified ring tone can be activated, the method proceeds to circle B.

Figure 3C:
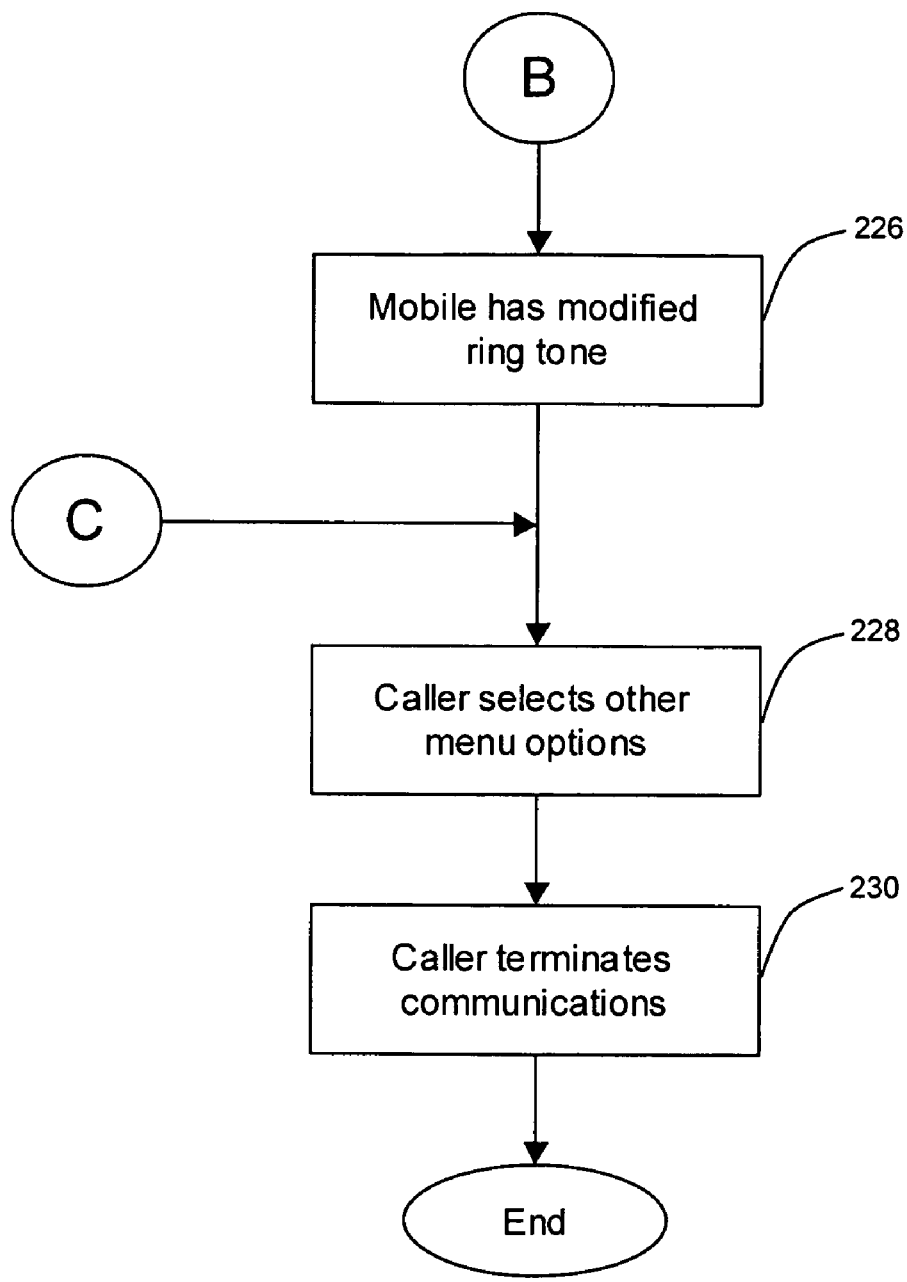
FIG. 3C shows the final page of the illustrative flowchart and follows FIG. 3B.

Referring to FIG. 3C there is shown the final page of the illustrative flowchart 200, which is initiated at circle B. The method then proceeds to block 226 where a set of programming instructions associated with the second ring tone are downloaded and executed on the illustrative handset 10, and the illustrative handset 10 is reprogrammed with the modified or second ring tone. The method may then proceed to block 228, where the caller may select another menu option such as checking their voice mail, or changing a password, or other such menu option that may be associated with the wireless handset 10. At block 230, the caller terminates communications with the illustrative network system 24. Meanwhile, the ring tone on the wireless handset 10 has been modified and an illustrative beacon ring tone has been initiated on the wireless handset 10.

Alternatively, the caller may have access to a mobile or wireless remote electronic device and attempt to locate the misplaced handset 10 while moving around. As the caller moves from one position to another, the caller may elect to change the ring tone from one particular ring tone to another. For example, the caller may elect to reprogram the mobile phone to operate in audible beacon ring mode, and then the caller may turn off the lights in a particular location and reprogram the mobile phone to operate in visible beacon ring mode. Thus, there may be a need to reprogram the misplaced handset ring tone while the user is searching for the misplaced handset.

Figure 4A:
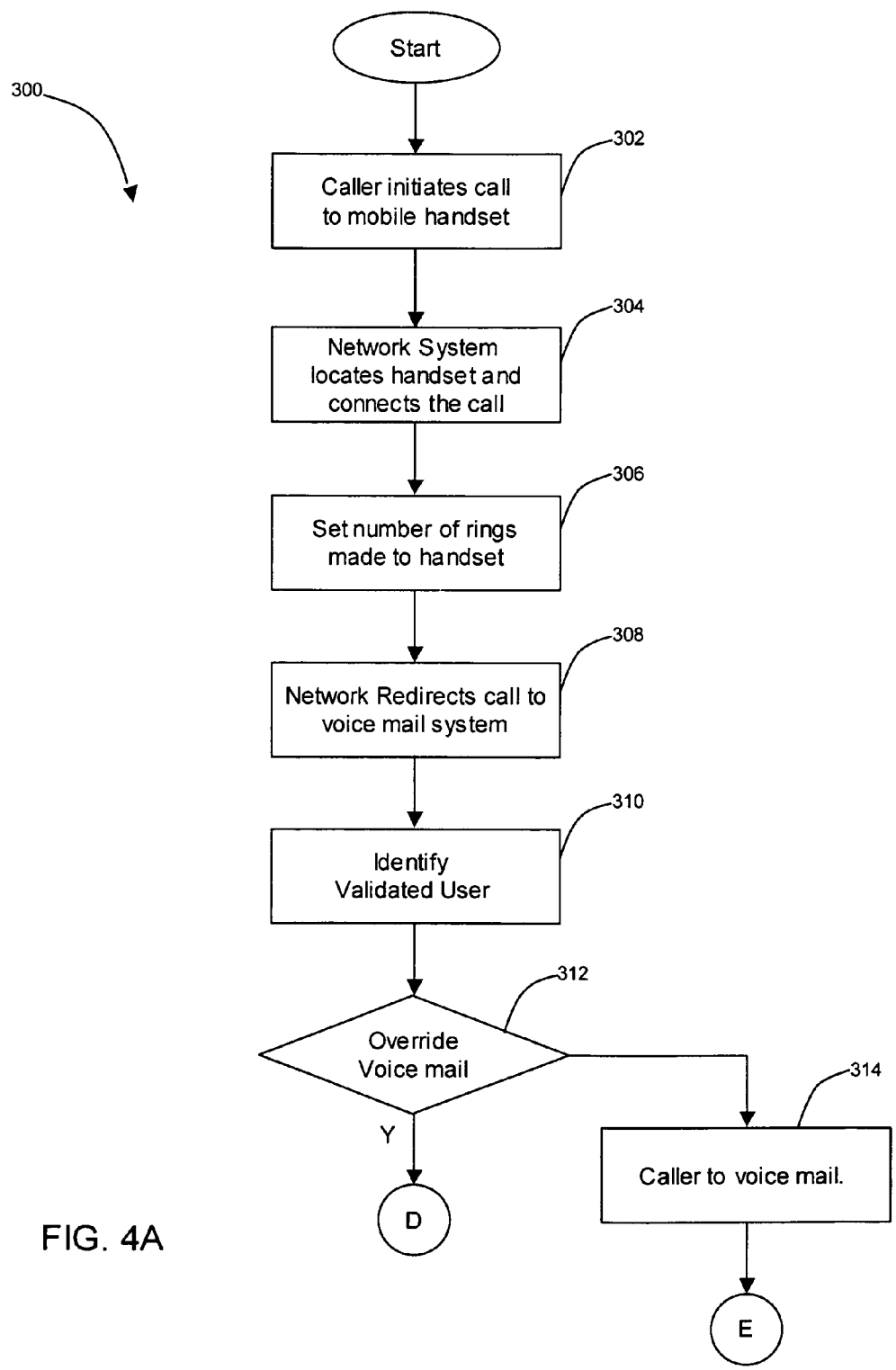
FIG. 4A shows an illustrative flow chart for a network changing the ring tone on the illustrative first wireless handset.

Referring to FIG. 4A there is shown an illustrative flow chart 300 for a network system to change the ring tone on the illustrative first wireless handset 10 described in FIG. 1. The method is initiated at block 302 where the caller initiates a call to the illustrative misplaced handset 10. At block 304 the network system 24 locates the handset 10 and connects the call. At block 306, the caller hears a set number of rings, and a set number of rings are made to the handset 10. If the misplaced handset 10 can not be located, the caller is directed to the voice mail system residing on the network system 24 as described by block 308.

In one illustrative embodiment, the caller may then be prompted by the network system 24 for a password at block 310. The password authenticates the caller as a validated user that is permitted to access the menu having the plurality of user selectable options. The password may be received by inputting a code or providing a voice biometric. Alternatively, the user may simply bypass the voice mail system, and be taken directly to decision diamond 312. At decision diamond 312, the user is provided with option to override the voice mail system. If the user does not elect to override the voice mail system, then the user goes to block 314 where the caller is provided with access to the voice mail system. If the caller decides to override the voice mail system, the user it taken to block 316 via circle D.

Figure 4B:
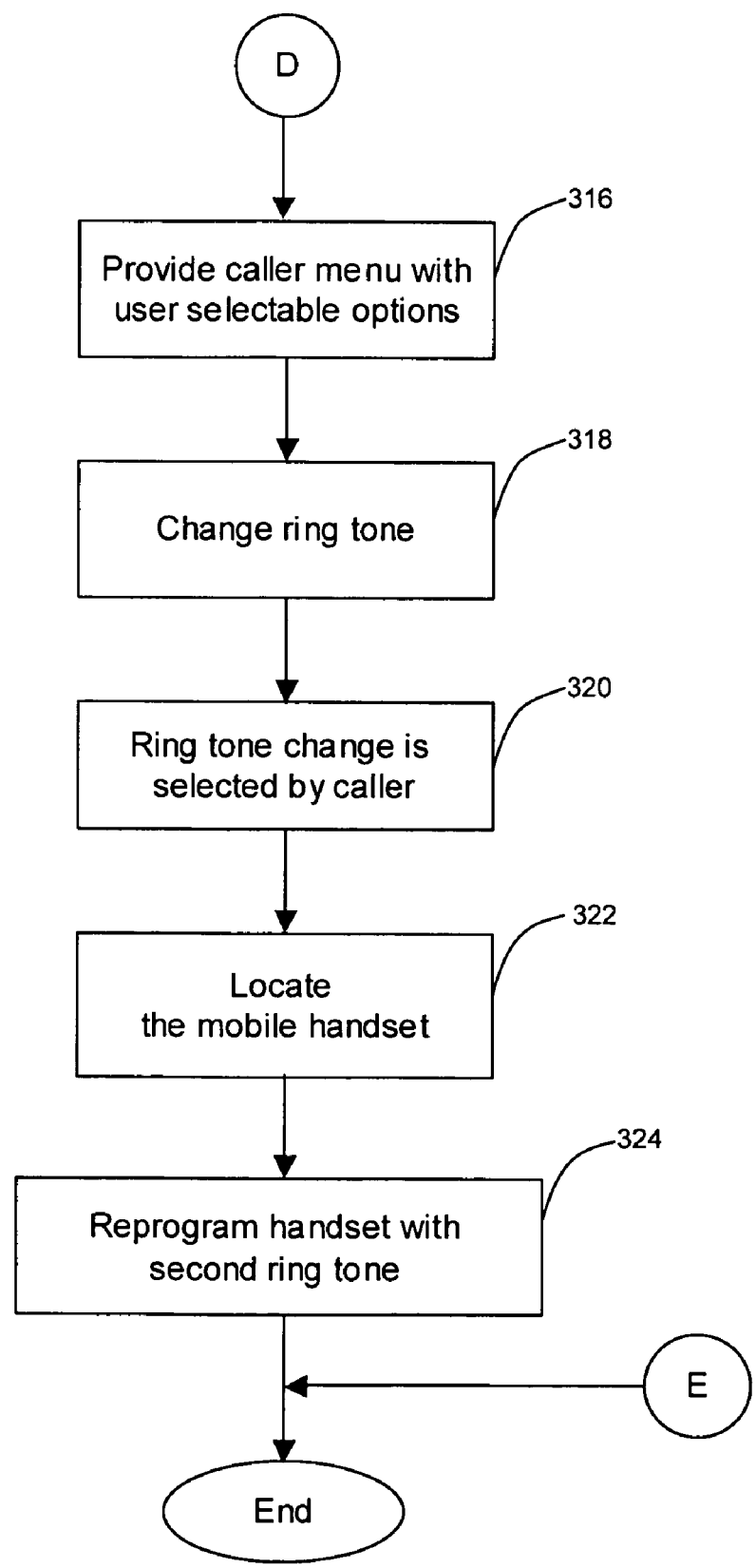
FIG. 4B shows a continuing illustrative flowchart that was initiated by FIG. 4A.

Referring to FIG. 4B there is shown a continuing illustrative flowchart that was initiated by FIG. 4A and is initiated by circle D. At block 316, the caller has elected to override the voice mail system, and an illustrative user menu is provided by an automated voice prompt. The menu comprises a user selectable option that is configured to permit the user to change the first ring tone on the wireless handset to a second ring tone. The illustrative voice menu may inform the caller that the ring tone may be changed if the illustrative handset 10 has been misplaced.

At block 318, the change ringer option is communicated to the caller by way of the illustrative voice prompt. Alternatively, a menu may be provided that requires inputting a code sequence via the keypad 116 on the illustrative mobile handset 100. The menu may provide a plurality of ring tone options for the second or modified ring tone, including but not limited to the beacon ring mode described above. The ring tones comprise detectable ring tones such as audible ring tones, visible ring tones, or a combination thereof.

At block 320, the ring tone change is selected by the caller. As described above, a variety of different ring tones may be selected. The network system 24 then proceeds to locate the illustrative wireless handset 10 at block 322. At block 324, the network system instructs the handset to reprogram its ring tone by having the network system 24 communicate to the illustrative misplaced handset 10 a plurality of computer instructions associated with the second ring tone, as described above.

Generally, the capability to have the illustrate handset 10 reprogram itself after communicating with network system 24 will not work outside the standard network covered by the user's service agreement. Many carriers have roaming agreements, but this does not include an over-the-air programming agreement. Thus, a mobile handset that is in roaming mode will not have the same programming capability as a mobile handset within the network covered by the subscriber's agreement.

It is to be understood that the foregoing is a detailed description of illustrative embodiments. The scope of the claims is not limited to these specific embodiments or examples. For example, a mobile handset 100 is described, however this solution may be extended to any wireless handset in operative communication with a network system. Therefore, various elements, details, execution of any methods, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A wireless communication system, comprising:
 a plurality of antennas that are operatively coupled to a mobile switching center, the antennas configured to initiate a plurality of communications with a wireless handset having a first ring tone that is imperceptible, the communications with the wireless handset are initiated from a remote electronic device;
 a network system communicatively coupled to the mobile switching center, the network system configured to process a request to change the first ring tone to a second ring tone, the request is made from the remote electronic device that is accessed by a validated user;
 a ring module communicatively coupled to the network system, wherein the ring module is enabled after receiving the request to change the first ring tone, the ring module includes,
  a plurality of downloadable ringtones, wherein each downloadable ringtone includes a set of programming instructions that are configured to be communicated to the wireless handset,
  a ring module database configured to store the downloadable ringtones;
 a memory associated with the wireless handset that is configured to store the downloadable ringtone communicated to the wireless handset using at least one of the plurality of antennas; and a processor configured to process the downloadable ringtone and change the first ring tone to the second ring tone.

2. The wireless communication system of claim 1 wherein the first ring tone comprises a low volume ring and the second ring tone comprises a perceptible ring tone.

3. The wireless communication system of claim 1 wherein the first ring tone comprises a vibrate ring tone and the second ring tone comprises a perceptible ring tone.

4. The wireless communication system of claim 1 wherein the second ring tone is a perceptible ring tone configured to facilitate finding the wireless handset.

5. The wireless communication system of claim 1 wherein the remote electronic device further comprises a SMS function that communicates a SMS message to the wireless handset, which changes the first ring tone to the second ring tone.

6. The wireless communication system of claim 1 wherein the request to change the first ring tone to the second ring tone is generated from the remote electronic device accessing a web page.

7. The wireless communication system of claim 1 wherein the request to change the first ring tone to the second ring tone is communicated using e-mail.

8. A wireless handset, comprising:
a downloadable ringtone that includes a set of programming instructions that are communicated to the wireless handset from a ring module communicatively coupled to a network system, wherein the wireless handset is configured to receive the downloadable ringtone;
a handset memory having a first ring tone stored thereon that is imperceptible, the handset memory configured to store the downloadable ringtone;
a handset antenna configured to receive the downloadable ringtone that corresponds to a second ring tone for the wireless handset;
a processor operatively coupled to the handset memory and the handset antenna, the processor configured to process the downloadable ringtone communicated by a validated user that remotely changes the first ring tone to the second ring tone; and
a handset speaker that is communicatively coupled to the processor and is configured to transform varying electrical signals associated with the second ring tone into a perceptible second ring tone.

9. The wireless handset of claim 8 wherein the set of programming instructions are communicated to the wireless handset from the network system that processes a request that is received from a remote electronic device.

10. The wireless handset of claim 9 wherein the set of programming instructions are communicated to the wireless handset after being triggered by the remote electronic device accessing a web page.

11. The wireless handset of claim 8 wherein the first ring tone comprises a low volume ring.

12. The wireless handset of claim 11 wherein the second ring tone is an audible downloadable ring tone.

13. The wireless handset of claim 8 wherein the set of programming instructions comprises a SMS programming instruction that changes the first ring tone to the second ring tone.

14. A method for remotely changing a ring tone on a wireless handset, the method comprising:
accessing a network system from a remote electronic device, the network system configured to communicate with the wireless handset;
permitting a validated user to access a menu on the network system having a user selectable option that permits changing a first ring tone that is imperceptible on the wireless handset;
allowing the validated user to interact with the menu associated with the network system so that the first ring tone on the wireless handset can be converted to a second ring tone that is perceptible;
permitting the validated user to access a ring module associated with the network system that is enabled after receiving a request to change the first ring tone from the validated user;
storing a plurality of selectable downloadable ringtones in a ring module database that is associated with the network system;
selecting one of the plurality of downloadable ringtones, in which each downloadable ringtone includes a set of programming instructions that are configured to be communicated to the wireless handset;
communicating the selected downloadable ringtone from the ring module to a wireless handset memory that is configured to store the downloadable ringtone; and
processing the selected downloadable ringtone with a wireless handset processor to remotely change from the first ring tone to the second ring tone.

15. The method of claim 14 wherein the set of programming instructions are triggered by a SMS message that is communicated to the wireless handset.

16. The method of claim 14 wherein the validated user accesses at least one web page that permits changing the first imperceptible ring tone to the second perceptible ring tone.

17. The method of claim 14 wherein the set of programming instructions are triggered by an e-mail instruction that is associated with the wireless handset.

* * * * *